United States Patent
Wang et al.

(10) Patent No.: US 7,452,139 B2
(45) Date of Patent: Nov. 18, 2008

(54) ALIGNING LENS CARRIERS AND FERRULES WITH ALIGNMENT FRAMES

(75) Inventors: William H. Wang, Pleasanton, CA (US);
Darren S. Crews, Santa Clara, CA (US);
Brian H. Kim, Fremont, CA (US);
Yousheng Wu, San Jose, CA (US);
Xiaojie J. Xu, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/890,242

(22) Filed: Aug. 3, 2007

(65) Prior Publication Data

US 2008/0044143 A1  Feb. 21, 2008

Related U.S. Application Data

(62) Division of application No. 11/507,184, filed on Aug. 21, 2006.

(51) Int. Cl.
*G02B 6/36* (2006.01)
*G02B 6/42* (2006.01)

(52) U.S. Cl. .............................. 385/92; 385/89; 385/93

(58) Field of Classification Search ........................ None
See application file for complete search history.

(56) References Cited

U.S. PATENT DOCUMENTS

| | | | |
|---|---|---|---|
| 4,732,446 A | | 3/1988 | Gipson et al. |
| 4,767,171 A | * | 8/1988 | Keil et al. .................... 385/35 |
| 5,040,868 A | | 8/1991 | Waitl et al. |
| 5,647,042 A | * | 7/1997 | Ochiai et al. .................. 385/56 |
| 5,708,743 A | | 1/1998 | Deandrea et al. |
| 5,825,949 A | | 10/1998 | Choy et al. |
| 5,929,730 A | * | 7/1999 | Hendel ......................... 335/78 |
| 6,137,158 A | | 10/2000 | Cohen et al. |
| 6,206,578 B1 | | 3/2001 | Shin et al. |
| 6,729,774 B1 | | 5/2004 | Rast et al. |
| 6,832,858 B2 | * | 12/2004 | Roth et al. ..................... 385/71 |
| 6,975,784 B1 | | 12/2005 | Xu et al. |
| 7,040,814 B2 | * | 5/2006 | Morimoto et al. .............. 385/88 |

(Continued)

FOREIGN PATENT DOCUMENTS

DE   19910164   9/2000

(Continued)

OTHER PUBLICATIONS

"PCT/US2005/034011", *Search Report*, (Apr. 13, 2006), 10 pages.

(Continued)

*Primary Examiner*—Hemang Sanghavi
*Assistant Examiner*—Omar Rojas
(74) *Attorney, Agent, or Firm*—Blakely, Sokoloff, Taylor & Zafman LLP

(57) ABSTRACT

Methods of aligning lens carriers and ferrules with alignment frames during assembly of optical cable connectors are disclosed. In one aspect, a method may include coupling an alignment frame with a circuit substrate, aligning a lens carrier with the alignment frame, and aligning a ferrule with the alignment frame. Other methods, apparatus, and systems incorporating the apparatus are also disclosed.

16 Claims, 15 Drawing Sheets

U.S. PATENT DOCUMENTS

| | | |
|---|---|---|
| 7,056,032 B2 * | 6/2006 | Cheng et al. .................. 385/88 |
| 7,083,336 B2 | 8/2006 | Kim et al. |
| 2003/0138219 A1 | 7/2003 | O'Toole et al. |
| 2005/0196109 A1 | 9/2005 | Kim et al. |
| 2006/0056779 A1 * | 3/2006 | Wang ......................... 385/92 |
| 2006/0067064 A1 | 3/2006 | Crews et al. |
| 2006/0067630 A1 | 3/2006 | Kim |
| 2006/0067631 A1 | 3/2006 | Wang |
| 2006/0067684 A1 | 3/2006 | Kim et al. |
| 2006/0067690 A1 | 3/2006 | Tatum et al. |
| 2006/0127012 A1 | 6/2006 | Barbarossa et al. |
| 2006/0133820 A1 | 6/2006 | Wang et al. |
| 2006/0133821 A1 | 6/2006 | Wang et al. |
| 2006/0140572 A1 | 6/2006 | Ruiz |
| 2006/0147159 A1 | 7/2006 | Chang et al. |
| 2006/0147214 A1 | 7/2006 | Ruiz et al. |

FOREIGN PATENT DOCUMENTS

| | | |
|---|---|---|
| EP | 0400176 | 12/1990 |
| EP | 1048965 | 11/2000 |

OTHER PUBLICATIONS

Network Technologies Inc., "DVI-D Fiber Optic Extension Cable", *Data Sheet*, www.nti1.com/pdf/cat-dvi-fiber-cable.pdf, (2006), 1 page.

Opticis, "Data Sheet", M2-100 / 210 /10S / 21S (Ver. 2.3), retrieved from www.opticis.com/product_hdmi_02.htm, (Aug. 3, 2005), 1 page.

Opticis, "Point to Point Hybrid Cable : M1-1POH", retrieved from www.opticis.com/product_hdmi_02.htm, (2005), 1 page.

Emcore Corporation, "QTR3400 & QTR3432 4-Channel Media Converters", *Product Brief*, (Dec. 2004), 2 pages.

Fujitsu, "o-microGiGaCN Data Sheet", *Revision 4.2*, (2006), pp. 1-13.

NTI, "DVI-D Fiber Optiic Extension Cable", *Network Technologies Incorporated*, (2006).

Opticis, "Express All-Fiber : M1-1000 (Upgraded version of M1-100)", www.optics.com/product_3.htm7/12/2006, (Jul. 12, 2006).

Opticis, "Point to Point Hybrid Cable : M1-1P0"www.opticis.com/product_31.htm7/12/2003, (2006).

Non-final Office Action U.S. Appl. No. 11/507,184, mailed Apr. 29, 2008. 10 pages.

* cited by examiner

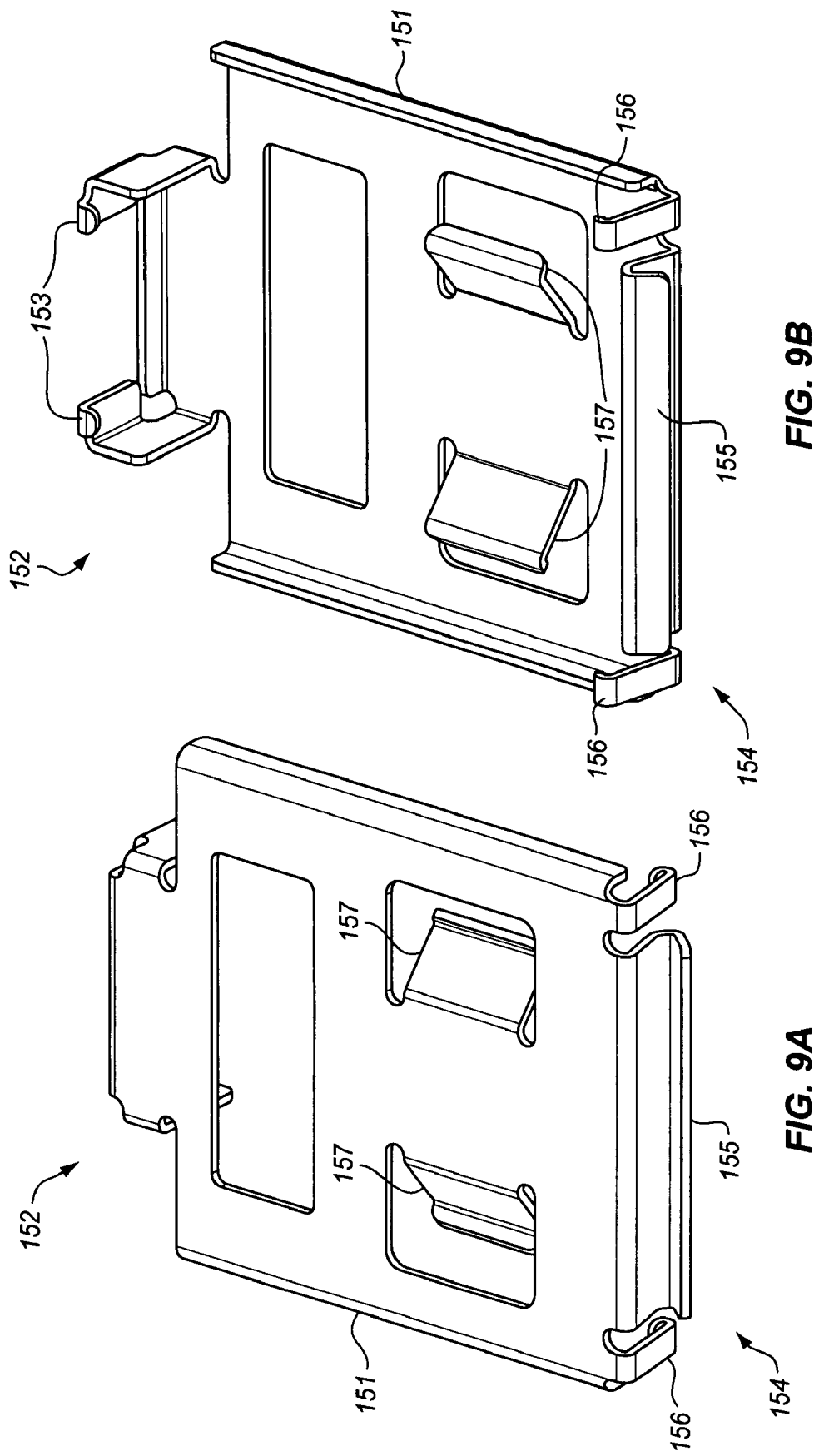

ALIGNING LENS CARRIERS AND FERRULES WITH ALIGNMENT FRAMES

The present application is a divisional of U.S. patent application Ser. No. 11/507,184, filed Aug. 21, 2006, entitled "Aligning Lens Carriers and Ferrules With Alignment Frames", currently pending. The U.S. patent application Ser. No. 11/507,184 is hereby incorporated herein by reference.

BACKGROUND

1. Field

Embodiments of the invention relate to cable connectors. In particular, embodiments of the invention relate to optical cable connectors.

2. Background Information

Cable connectors are commonly used to electrically interconnect different electronic devices to allow them to exchange data. These cable connectors often rely on copper or other highly conductive metals to convey electronic signals representing the data.

However, the use of copper and other highly conductive metals may offer certain potential disadvantages. For example, copper may have difficulties keeping up with the current high and ever-increasing data rates. As data rates increase, the span of copper cable over which an electrical signal may propagate while incurring tolerable degradation may decrease. Additionally, in certain aspects, copper cables tend to have large cross sections and to be relatively heavy. The copper cables may also tend to have a relatively large bend radius, which may reduce flexibility.

Alternatives to copper and other metal cables may thus offer certain advantages. In particular, optical cables may offer certain advantages.

BRIEF DESCRIPTION OF THE SEVERAL VIEWS OF THE DRAWINGS

The invention may best be understood by referring to the following description and accompanying drawings that are used to illustrate embodiments of the invention. In the drawings:

FIGS. 9A-B are perspective views of the top and bottom, respectively, of a ferrule latch, according to one or more embodiments of the invention.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

Figure 1:
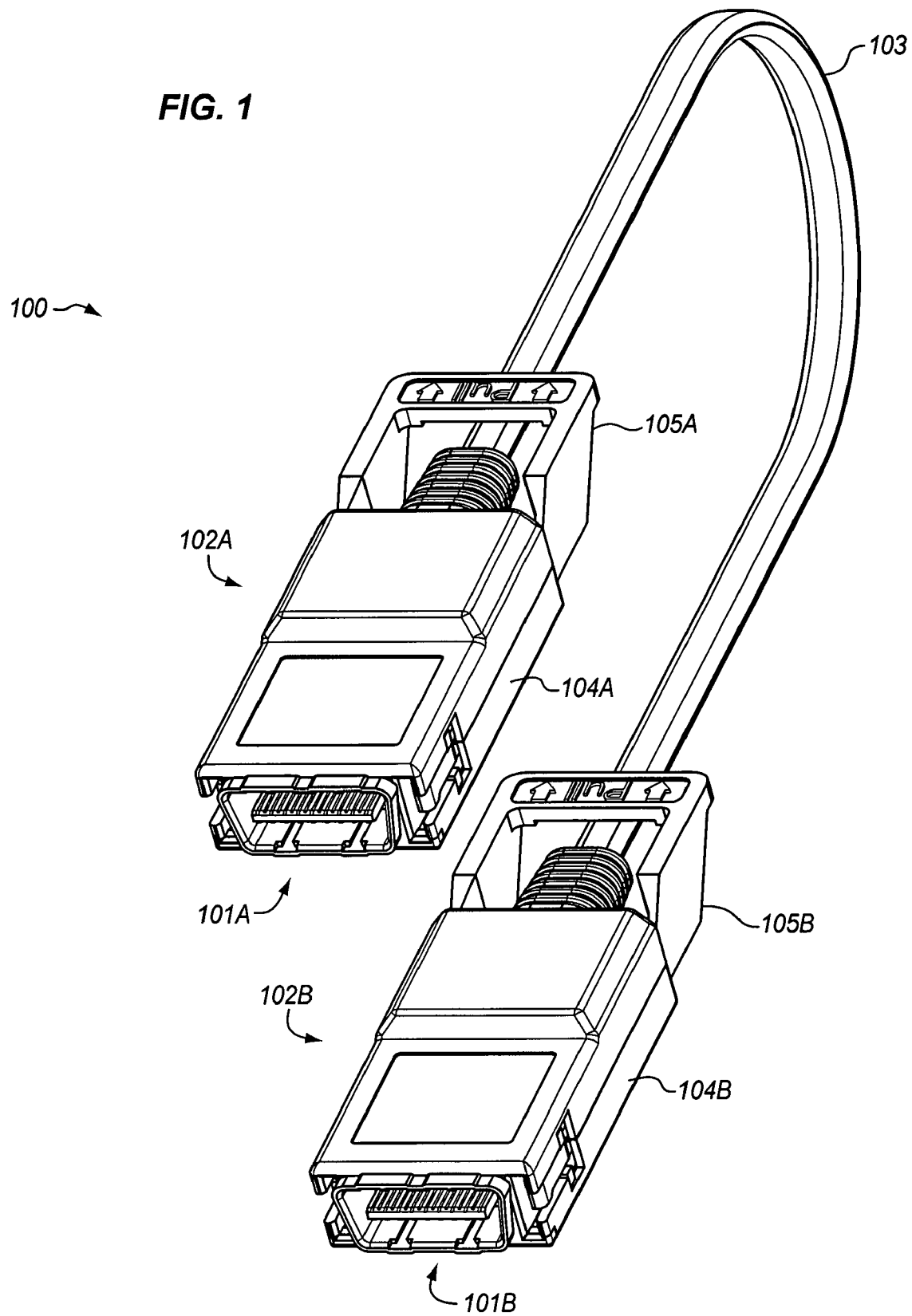
FIG. 1 is a perspective view of an optical cable connector, according to one or more embodiments of the invention.

FIG. 1 is a perspective view of an optical cable connector 100, according to one or more embodiments of the invention. In one or more embodiments of the invention, the optical cable connector may be used as a direct replacement for an Infiniband™ copper cable, or other type of copper or metal cable known in the art, to connect electronic devices or other electrical signaling mediums via an intervening optical signaling medium.

The optical cable connector includes a first terminal end 102A, a second terminal end 102B, and intermediate optionally jacketed and optionally ribonized optical fibers 103 disposed between the first and second terminal ends. The first terminal end has a first electrical connector plug 101A, a first housing 104A, and a first optional pull bail 105A. Likewise, the second terminal end has a second electrical connector plug 101B, a second housing 104B, and a second optional pull bail 105B. Each of the electrical connector plugs may be plugged or otherwise connected with a corresponding, mating electrical connector on either the same or different electronic device. In one or more embodiments of the invention, the electrical connector plugs may comply with existing or future Infiniband™ standards, although the scope of the invention certainly is not limited in this respect. The pull bails, which are optional, may facilitate disconnecting cables, or otherwise handling the cables.

The scope of the invention is not limited to connecting the optical cable connector to any known type of electronic device. The optical cables disclosed herein may be used to provide a wide variety of different types of connections, such as, for example, system-to-system, board-to-board, blade-to-blade, and chip-to-chip. As such, examples of suitable electronic devices include, but are not limited to, computer systems (for example desktop computers, laptop computers, servers, blades), computer system peripherals (for example display devices, printers, and boards), network devices (for example switches and routers), chips (for example, microprocessors, graphics processors, memory chips, other chipset components, and the like).

Electrical signals may be received from a first electronic device through the first electrical connector. The received electrical signals may be converted to corresponding optical signals by one or more first optoelectronic components inside the first housing. Then, the optical signals may be transmitted on the intermediate optical cable to the second terminal end. The optical signals received at the second terminal end may be converted back to the corresponding electrical signals by one or more second optoelectronic components inside the second housing. The electrical signals may be provided to a second electronic device through the second electrical connector.

Figure 2:
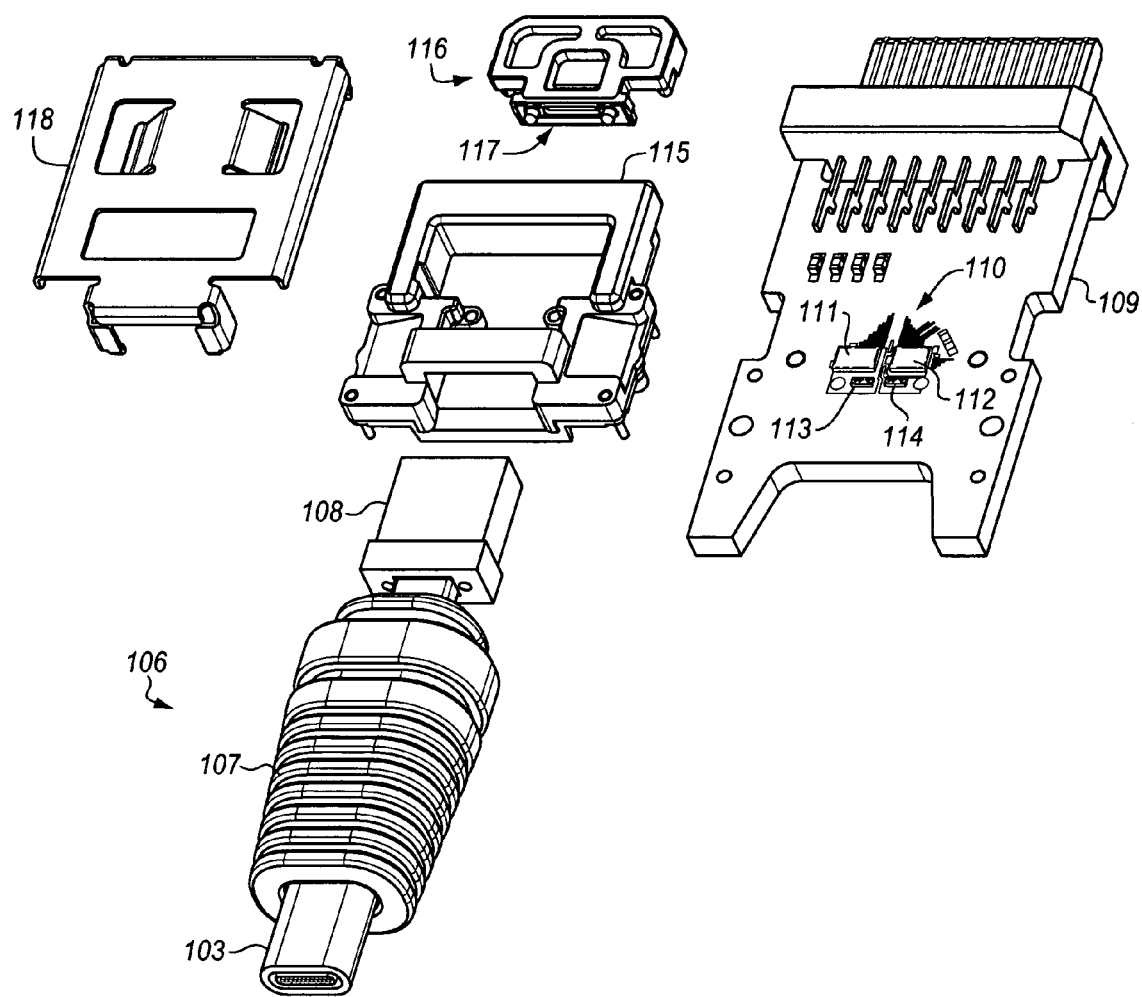
FIG. 2 is an exploded, perspective view illustrating some of the major components of a terminal end of an optical cable, according to one or more embodiments of the invention.

FIG. 2 is an exploded, perspective view illustrating some of the major components of a terminal end of an optical cable, according to one or more embodiments of the invention. The outer housing and pull bail, which are not illustrated, will be discussed further below.

The illustrated components include an optical cable termination 106 having a cable bushing 107 and ferrule 108 located generally at a termination of the optical fibers 103. The cable bushing may include a thick section of plastic, rubber, or other flexible material that may help to protect the end of the terminations of the optical fiber from wear or damage. The ferrule may represent a device, such as, for example, a precision tube, or patterned substrate, which may hold one or more optical fibers of the optical cable to promote accurate alignment, interconnection, or termination.

A circuit substrate 109, such as, for example, a printed circuit board (PCB), printed wiring board, etched wiring board, or the like, is illustrated and has components 110 electrically coupled therewith. The components may include one or more integrated circuits and one or more optoelectronic components. As shown, in the illustrated embodiment, the components may include a transmit integrated circuit 111, a receive integrated circuit 112, one or more light emitter optoelectronic devices 113, and one or more light detector optoelectronic devices 114. Alternatively, a single integrated circuit may optionally be used to perform both receive and transmit processing. As yet another option, only one but not both of receive and transmit may be supported. Examples of suitable light emitter optoelectronic devices include, but are not limited to, vertical cavity surface emitting lasers (VCSELs), other semiconductor laser diodes, and other miniature lasers known in the arts. Examples of suitable light detector optoelectronic devices include, but are not limited to, one or more PIN diodes (p-type, intrinsic, n-type diodes), other photodiodes, or other photodetectors known in the arts. The scope of the invention is not limited to any known type of light detectors or emitters.

An alignment frame 115 is also illustrated. As will be discussed further below, in one or more embodiments of the invention, the alignment frame may include one or more alignment features to facilitate precision alignment of components, such as, for example, a lens carrier 116 and ferrule 108, during assembly, although this is not required.

A lens carrier 116 is also illustrated. The lens carrier includes one or more or an array of lenses 117. In one or more embodiments of the invention, the lens carrier may be mounted, otherwise assembled on, or otherwise physically coupled with the alignment frame so that the lenses may receive light from the one or more optical fibers of the ferrule. As will be discussed further below, in one or more embodiments of the invention, the lens carrier may include alignment features that may correspond to alignment features on the alignment frame to allow the lenses to be accurately aligned relative to the fibers, although this is not required.

The illustrated components further include an optional ferrule latch 118. The ferrule latch, which is optional, may help to hold the ferrule and lens array close together to promote good optical coupling, although it is not required that the ferrule latch be included. As will be explained in further detail below, one end of the ferrule latch may latch or retain the ferrule and another opposite end of the ferrule latch may latch or retain the alignment frame in order to force the ferrule and lens carrier toward one another.

Figure 3:
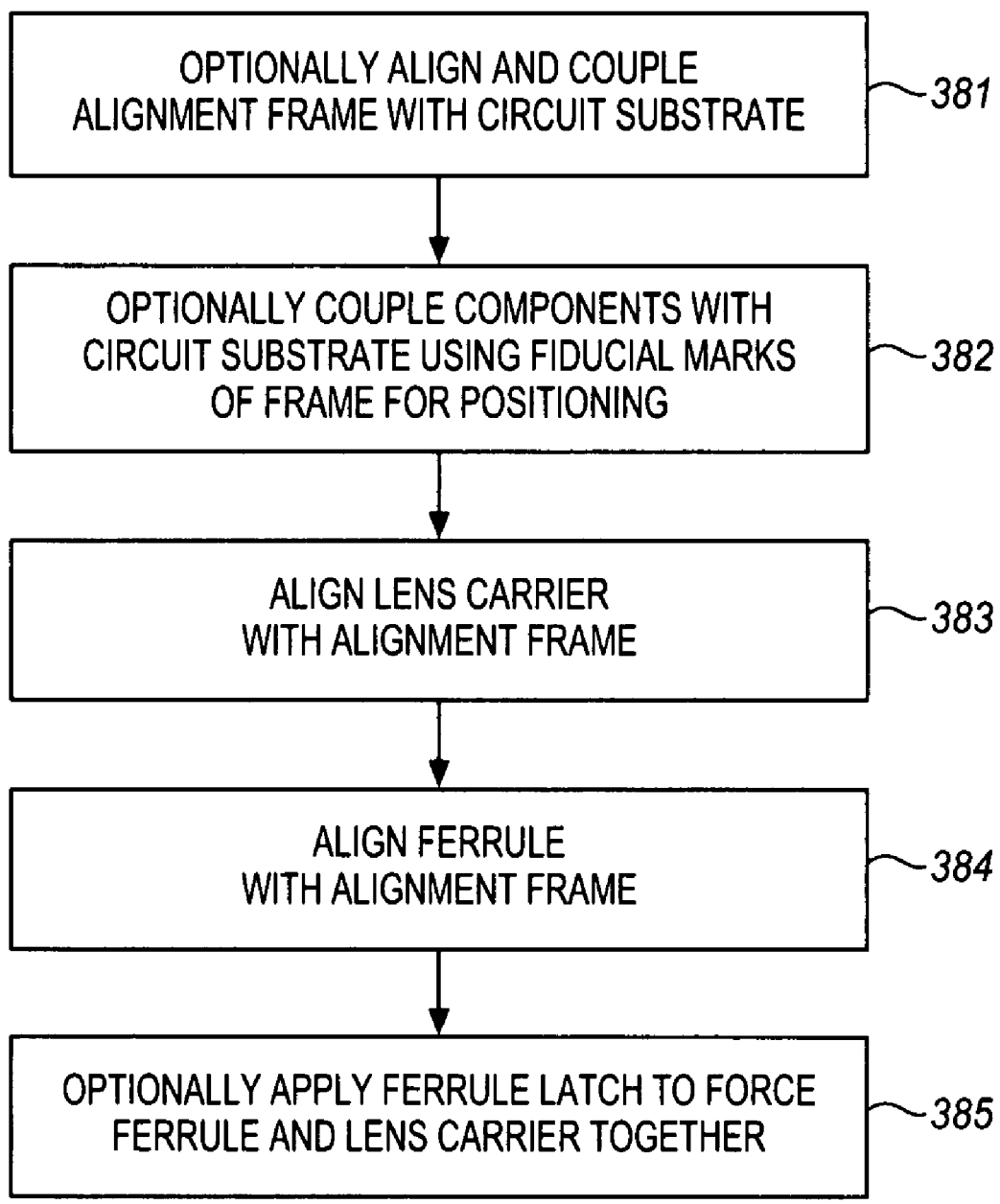
FIG. 3 is a block flow diagram of a method of assembling a portion of an optical cable connector, according to one or more embodiments of the invention.

FIG. 3 is a block flow diagram of a method 380 of assembling a portion of an optical cable connector, according to one or more embodiments of the invention.

The method includes optionally aligning, and coupling an alignment frame, such as, for example, alignment frame 115, with a circuit substrate, such as, for example, circuit substrate 109, at block 381. In one or more embodiments of the invention, if optional alignment is desired for the particular implementation, one or more alignment structures of the alignment frame may optionally be mated with one or more corresponding alignment structures and the circuit board. Alternatively, the alignment frame may be coupled with the circuit board without such passive, accurate alignment, or without such align-assist structures.

Then, components, such as, for example, one or more of microelectronic components 111, 112 and optoelectronic components 113, 114, may be physically and/or electrically coupled with the circuit substrate, at block 382. As shown, in one or more embodiments of the invention, one or more fiducial marks of the alignment frame may optionally be used to position the components, such as, for example, by using machine vision to position the components. Alternatively, such components may be positioned without using fiducial marks. Furthermore, in one or more alternate embodiments of the invention, the components may optionally be coupled with the circuit substrate at a different time, such as, for example, prior to coupling the alignment frame with the circuit substrate.

Then, a lens carrier, such as, for example, the lens carrier 116, may be aligned with the alignment frame, at block 383. In one or more embodiments of the invention, this may include mating one or more alignment structures of the alignment frame with one or more corresponding alignment structures of the lens carrier, although the scope of the invention is not limited in this respect. For example, one or more male members may be inserted into one or more female members. As another example, one or more contoured surfaces of the lens carrier may be abutted against one or more corresponding contoured surfaces of the alignment frame. These are just a few examples and the scope of the invention is not limited to just these particular examples.

Then, a ferrule, such as, for example, the ferrule 108, may be aligned with the alignment frame, at block 384. In one or more embodiments of the invention, this may include inserting the ferrule through an alignment opening in the alignment frame. In one or more embodiments of the invention, the opening may optionally be fitted relatively tightly to the ferrule and opposing walls of the ferrule may optionally abut against corresponding optionally wide guiding walls of the alignment frame, although the scope of the invention is not limited in this respect.

Then, a ferrule latch, such as, for example, the ferrule latch 118, may optionally be applied to force the ferrule and lens carrier together. In one or more embodiments of the invention, this may include placing a first end or portion of the ferrule latch over the ferrule, and placing a second, opposing end or portion of the ferrule latch over the alignment frame. Optionally, one or more hooks of the ferrule latch may hook on hookable structures of the ferrule and alignment frame. In one aspect, the ferrule latch may optionally include a spring tab or other extendable portion that may be extended over the alignment frame to apply the force that holds the ferrule and lens carrier in proximity.

Now, the scope of the invention is not limited to the particular method illustrated. Alternate embodiments are contemplated in which operations of the aforementioned methods are optionally performed in different order. For example, the components may be coupled with the circuit substrate either before the coupling of the alignment frame to the circuit substrate or after the coupling of the alignment frame to the circuit substrate. As another example, the lens carrier and/or the ferrule may be aligned to the alignment frame before the alignment frame is coupled to the circuit substrate. Alternate embodiments are contemplated in which operations are optionally added to and/or removed from the aforementioned methods. For example, application of the ferrule latch is optional and may optionally be omitted if desired. As another example, positioning the components using fiducial marks of the frame is optional and may optionally be omitted if desired. Further modifications and adaptations to the methods are contemplated and will be apparent to those skilled in the art and having the benefit of the present disclosure.

Figure 4:
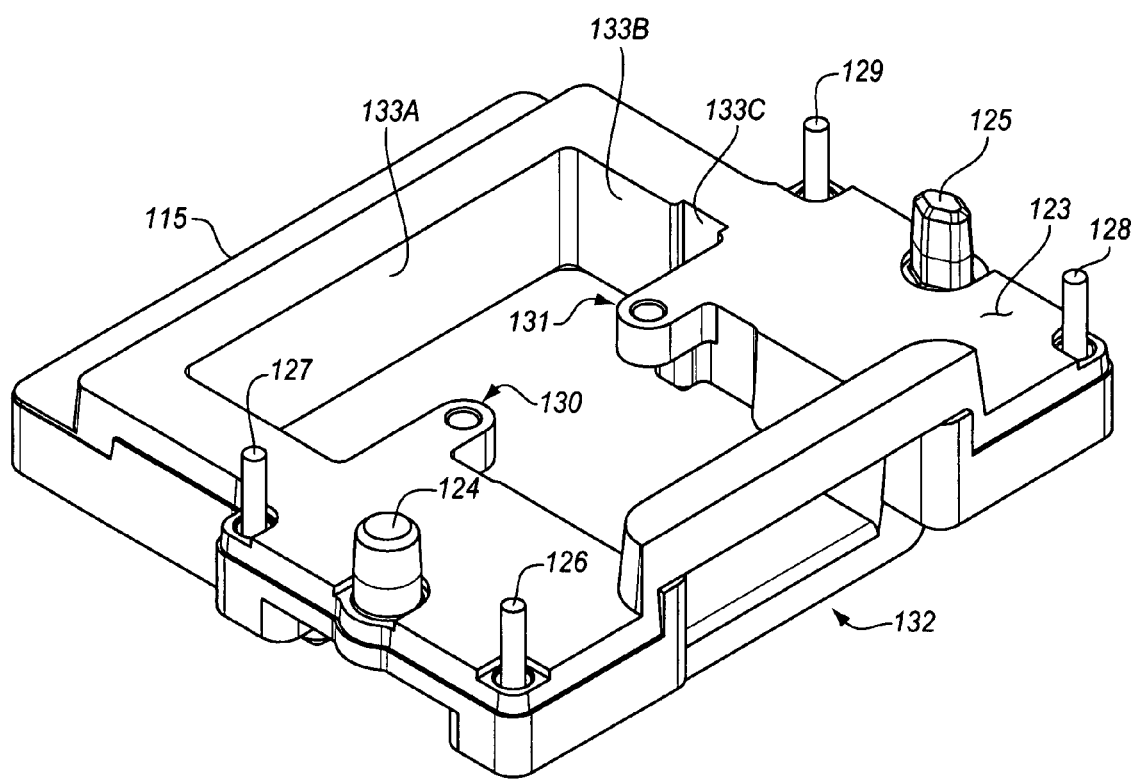
FIG. 4 is a perspective view of an alignment frame having various alignment structures, according to one or more embodiments of the invention.

To further illustrate certain concepts, a few specific examples of the aforementioned assembly methods will be discussed in conjunction with the drawings. FIG. 4 is a perspective view of an alignment frame 115 having various alignment structures, according to one or more embodiments of the invention. The alignment frame is shown in an inverted orientation with a bottom surface 123, which is intended to be adjacent the circuit substrate 109, positioned on top to facilitate illustration of the alignment structures. It should be noted that terms such as "top", "bottom", "upper", "lower", "below", "above", "vertical", "horizontal", "right", "left", and the like, are used herein only to facilitate the description of the devices as illustrated. It should be understood that the devices may be used in a variety of orientations, including, but not limited to, inverted and sideways orientations.

In one or more embodiments of the invention, the alignment frame may include a molded or precision molded plastic, although the scope of the invention is not limited in this respect. The frame may optionally be simple and may lack electrical and optical components and functionalities. The alignment frame includes a ferrule alignment receptacle or opening 132 designed to receive a ferrule therein. As shown in the illustrated embodiment, the ferrule alignment receptacle or opening may include a relatively rectangular opening at one end of the alignment frame. Alternatively, the ferrule receptacle or opening may have other shapes generally conforming to the shape of the ferrule. The opening and the sidewalls of the ferrule receptacle or opening may guide and align insertion of the ferrule. During insertion, opposing walls of the ferrule may abut and contact corresponding guiding walls of the alignment frame. In one aspect, the guiding walls may optionally be relatively wide to provide extra surface for coplanar abutment or contact to promote accurate alignment, although this is not required. This alignment opening may help to facilitate accurate alignment of the optical fibers of the ferrule to the lens array, as will be discussed further below.

As discussed above, the alignment frame may be assembled relative to the circuit substrate. In one or more embodiments of the invention, the alignment frame may include one or more alignment structures designed or configured to mate with corresponding alignment structures on the circuit substrate in order to facilitate accurate alignment of the alignment frame relative to the circuit substrate. Suitable mating alignment structures include, but are not limited to, female structures and male members. Examples of suitable male members include, but are not limited to, pins, rods, posts, bumps, ridges, and other projections. Examples of suitable female structures include, but are not limited to, holes, openings, grooves, cavities, and other voids. In one or more embodiments, different sized, shaped, or spaced alignment structures may optionally be included, such as, for example, to provide more alignment tolerance in one direction than another. In one or more embodiments, after alignment, the aligned structures may optionally be soldered, glued, or otherwise adhered in alignment.

By way of example, and not limitation, refer to the illustrated alignment frame, which includes a number of alignment structures. It is to be appreciated that the scope of the invention is not limited to including as many alignment features as are shown, or the particular types of alignment features that are shown. The illustrated alignment frame includes a first alignment pin 124 on a first side of the alignment frame and a second alignment pin 125 on a second side of the alignment frame. The alignment pins may be inserted into corresponding mating openings on the circuit substrate in order to locate and accurately align the alignment frame relative to the circuit substrate. Alternatively, the alignment frame may have female structures to receive or mate with male members of the circuit substrate.

In one or more embodiments of the invention, the first and second alignment pins may have different shapes. For example, as shown in the illustrated embodiment, the first alignment pin 124 may be circular in cross-section, whereas the second alignment pin 125 may be diamond, triangular, oval, rectangular, or otherwise non-circular in cross-section. Alternatively, the first and second alignment pins may have different sizes, such as, for example, different diameters. As shown, in one or more embodiments of the invention, the diamond pin 125, which is optional and not required, may be elongated in the ferrule insertion direction compared to the orthogonal direction connecting the round and diamond pins. This may allow more freedom of movement during alignment (or alignment mismatch) in one direction, such as, for example, the direction transverse to the ferrule insertion direction, than in another direction, such as, for example, the ferrule insertion direction.

The illustrated alignment frame further includes four optional attachment pins 126-129 to attach the alignment frame to the circuit substrate. In alternate embodiments, fewer (including zero) or more attachment pins may optionally be used. In one or more embodiments of the invention, the attachment pins, such as, for example, metal pins, may be inserted into openings in the circuit substrate, and soldered, glued, or otherwise adhered therein. The attachment pins may optionally fit relatively loosely in their respective holes to avoid conflict with the alignment provided by the alignment structures. Alternatively, the attachment pins may optionally be omitted and the first and second alignment pins 124, 125 may be soldered, glued, or otherwise adhered in alignment with the circuit substrate. As yet another option, the first and second alignment pins 124, 125 may optionally be omitted, and two or more of the attachment pins 126-129 may be used to provide alignment and attachment.

The lens carrier may be aligned and coupled with the alignment frame, for example, after the alignment frame has been coupled with the circuit substrate. In one or more embodiments of the invention, the alignment frame may include one or more alignment structures to mate with corresponding alignment structures on the lens carrier in order to facilitate accurate alignment of the lens carrier relative to the alignment frame. Suitable alignment structures include, but are not limited to, the female structures and male members mentioned above. As before, in one or more embodiments of the invention, differently sized, shaped, or spaced alignment structures may optionally be used to provide orientation as well as alignment, although this is not required. In one or more embodiments of the invention, the alignment structures, or dedicated attachment structures, may be glued, welded, or otherwise adhered to hold the lens carrier and alignment frame in alignment.

By way of example, and not limitation, refer to the illustrated alignment frame. The illustrated alignment frame includes a first alignment opening 130 and a second alignment opening 131. In one or more embodiments of the invention, the openings may include molded precision holes, although this is not required. The openings may alternatively be drilled, or otherwise mechanically formed. The alignment openings are located on opposite sides of the alignment frame generally behind the ferrule receptacle or opening. The first and second alignment openings may mate with corresponding pins or other male members on the lens carrier. Alternatively, the alignment frame may have pins or other male members and the lens carrier may have holes or other female structures.

A portion of the alignment frame proximate the intended location of assembly of the lens carrier may optionally have a contoured shape or other shape to guide or align the assembly of the lens carrier. For example, as shown in FIG. 4, the illustrated alignment frame includes several contour alignment surfaces 133A, 133B, and 133C to guide and align the assembly of the lens carrier to the alignment frame.

As will be discussed in further detail below, in one or more embodiments of the invention, the alignment frame may be assembled relative to the circuit substrate prior to coupling the integrated circuits and/or optoelectronic components on the circuit substrate. In such embodiments, features of the alignment frame may optionally be used as fiducial marks to facilitate coupling of the integrated circuits and/or optoelectronic components on the circuit substrate. For example, in one or more embodiments of the invention, the first and second alignment openings 130, 131 may optionally be used as fiducial marks for machine vision equipment during attachment of the integrated circuits and/or optoelectronic components to the circuit substrate.

Figure 5:
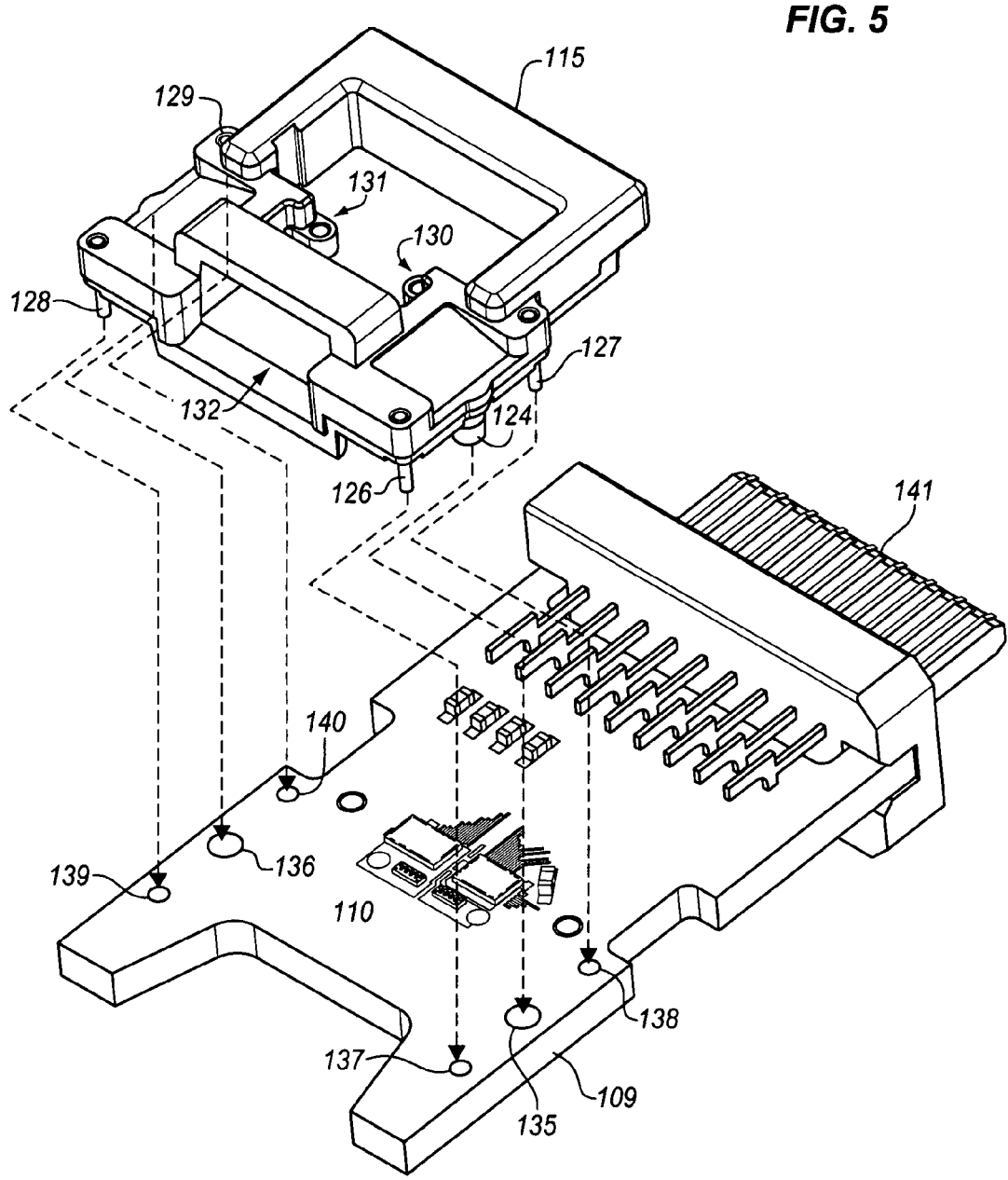
FIG. 5 is a perspective view showing how an alignment frame may be optionally aligned and coupled with a circuit substrate, according to one or more embodiments of the invention.

FIG. 5 is a perspective view showing how an alignment frame 115 may be optionally aligned and coupled with a circuit substrate 109, according to one or more embodiments of the invention. As shown, in one or more embodiments of the invention, corresponding alignment features of the alignment frame and circuit substrate may be used to facilitate accurate alignment during the assembly. In particular, the circuit substrate includes alignment structures that correspond with mating alignment structures of the alignment frame. In particular, the circuit substrate includes first and second alignment openings 135, 136 that respectively correspond in size and position to the first and second alignment pins 124, 125 on the alignment frame. Likewise, the circuit substrate includes four pin openings 137-140 that respectively correspond in size and position to the four attachment pins 126-129. Dashed lines are included to illustrate the correspondence of the alignment structures. After the alignment and assembly, the attachment pins may optionally be soldered, or otherwise adhered in place.

The illustrated circuit substrate also includes the components 110 coupled therewith. Note that as previously mentioned these components may either be coupled with the circuit substrate before or after the assembly of the alignment frame to the circuit substrate. In one aspect, the alignment frame may be assembled to the circuit substrate before coupling of the components, and a portion of the alignment frame, such as, for example, the first and second alignment openings 130, 131 may be used as fiducials by machine vision equipment during the coupling of the components to the circuit substrate.

The illustrated circuit substrate also includes an electrical connector 141. In one or more embodiments of the invention, the electrical connector may include a commercially available discrete connector. For example, in one particular embodiment of the invention, the electrical connector may include a commercially available impedance control connector suitable for high speed differential data transfer. However, such commercially available electrical connectors may potentially be costly. As another option, in one or more embodiments of the invention, the electrical connector may include metal traces, such as, for example, hard gold plated traces, formed on the circuit substrate. Such an approach may allow cost savings, provide good impedance control, and eliminate some signal reflection that tends to occur at the connector soldering pad.

Figure 6:
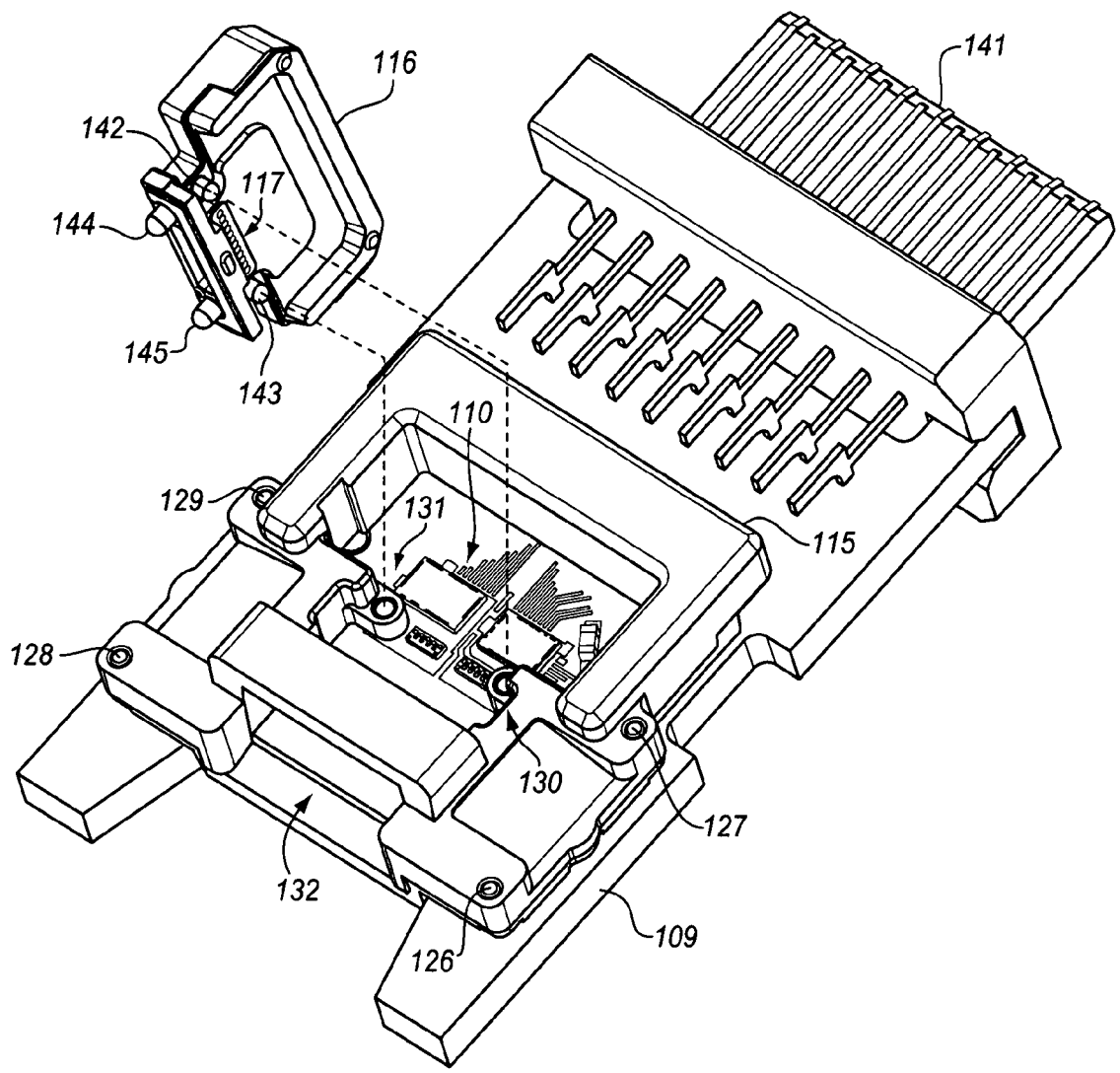
FIG. 6 is a perspective view showing how a lens carrier may be aligned and coupled with the alignment frame of the sub-assembly formed as shown in FIG. 5, according to one or more embodiments of the invention.

FIG. 6 is a perspective view showing how a lens carrier may be aligned and coupled with the alignment frame of the sub-assembly formed as shown in FIG. 5, according to one or more embodiments of the invention. As shown, in one or more embodiments of the invention, corresponding alignment features of the lens carrier and alignment frame may be mated to facilitate accurate alignment of the lens carrier to the alignment frame. In particular, first and second male members 142, 143 of the lens carrier, respectively, correspond in size and position to the first and second alignment openings 130, 131 of the alignment frame. By way of example, the first and second male members may include rounded pins, or other protuberances. These male members may be inserted into the one or more corresponding female members on the alignment frame. Dashed lines are included to illustrate the correspondence of the alignment structures. Additionally, as shown, the lens carrier and the alignment frame may have various mating or matching contoured surfaces to further facilitate alignment. The one or more contoured surfaces of the lens carrier may abut, contact, or otherwise mate with one or more corresponding contoured surfaces of the alignment frame. These alignment structures may facilitate accurate alignment of the lens array 117 of the lens carrier relative to the alignment frame. After the alignment and assembly, the lens carrier may optionally be glued, welded, or otherwise adhered in place to the alignment frame.

Figure 7:
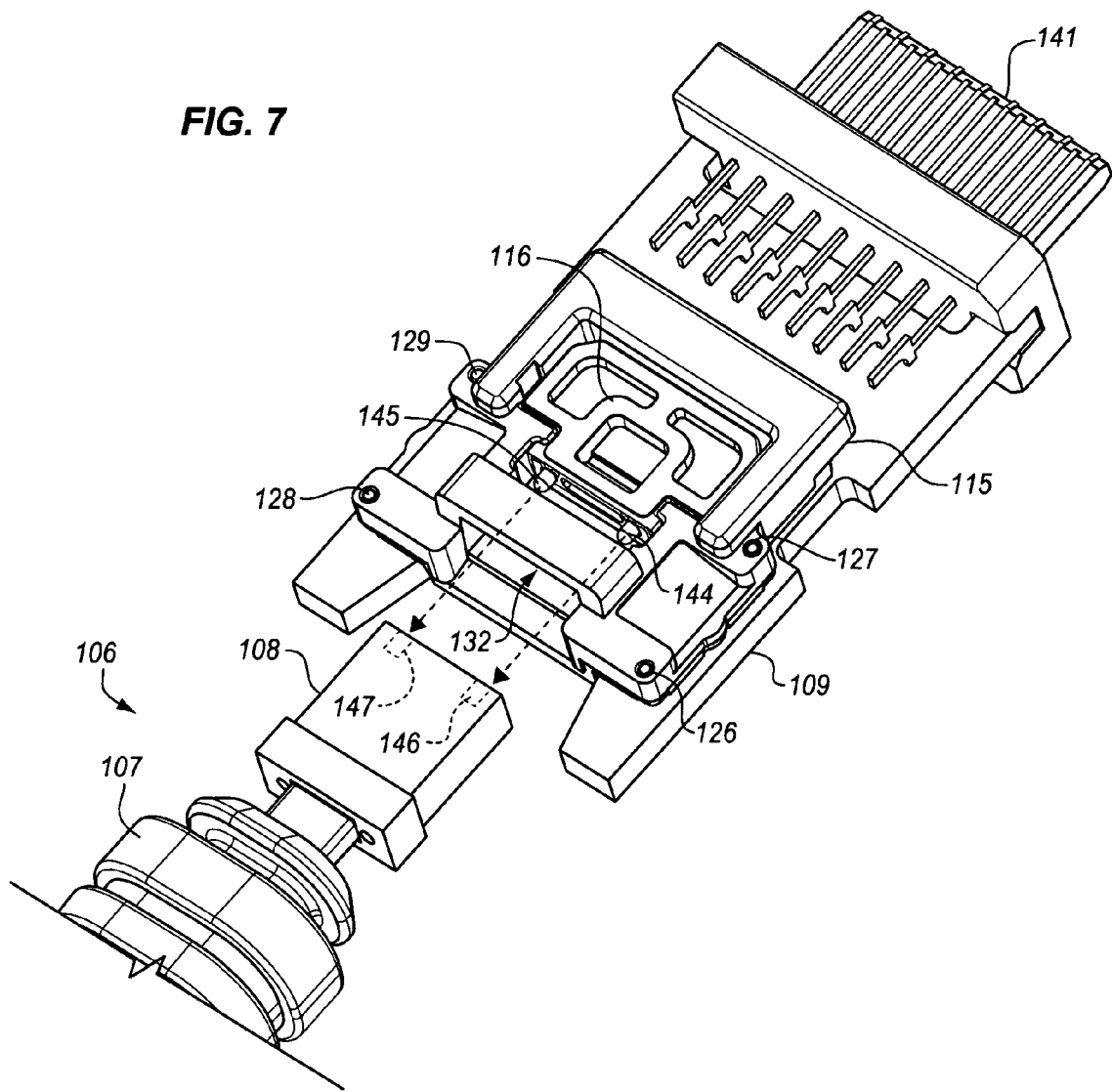
FIG. 7 is a perspective view showing how a ferrule may be aligned and coupled with the alignment frame of the sub-assembly formed as shown in FIG. 6, according to one or more embodiments of the invention.

FIG. 7 is a perspective view showing how a ferrule 108 may be aligned and coupled with the alignment frame of the sub-assembly formed as shown in FIG. 6, according to one or more embodiments of the invention. As shown, in one or more embodiments of the invention, corresponding alignment features of the ferrule and sub-assembly may optionally be used to facilitate accurate alignment of the ferrule to the sub-assembly. As previously mentioned, the ferrule alignment opening or receptacle 132 may help to align and guide insertion of the ferrule. In one or more embodiments of the invention, the ferrule opening or receptacle may have slightly larger but optionally substantially the same size and shape as the ferrule. Opposing walls of the ferrule may abut, contact, or otherwise mate with corresponding guiding walls of the alignment frame. In one aspect, the opening may optionally have relatively wide sidewalls to provide additional surface for coplanarity to guide and align the insertion of the ferrule so that the optical fibers may be accurately aligned relative to the alignment frame and the lens array, although this is not required.

Furthermore, in one or more embodiments of the invention, the ferrule may optionally have one or more, or a plurality, of alignment structures at an end thereof having the ends of the optical fibers, and the lens carrier may have one or more, or a plurality, of corresponding alignment structures. For example, in the illustrated embodiment, the lens carrier has a third male member 144 and a fourth male member 145 that respectively correspond in size and position to a first female structure 146 and a second female structure 147 of the ferrule.

Figure 8:
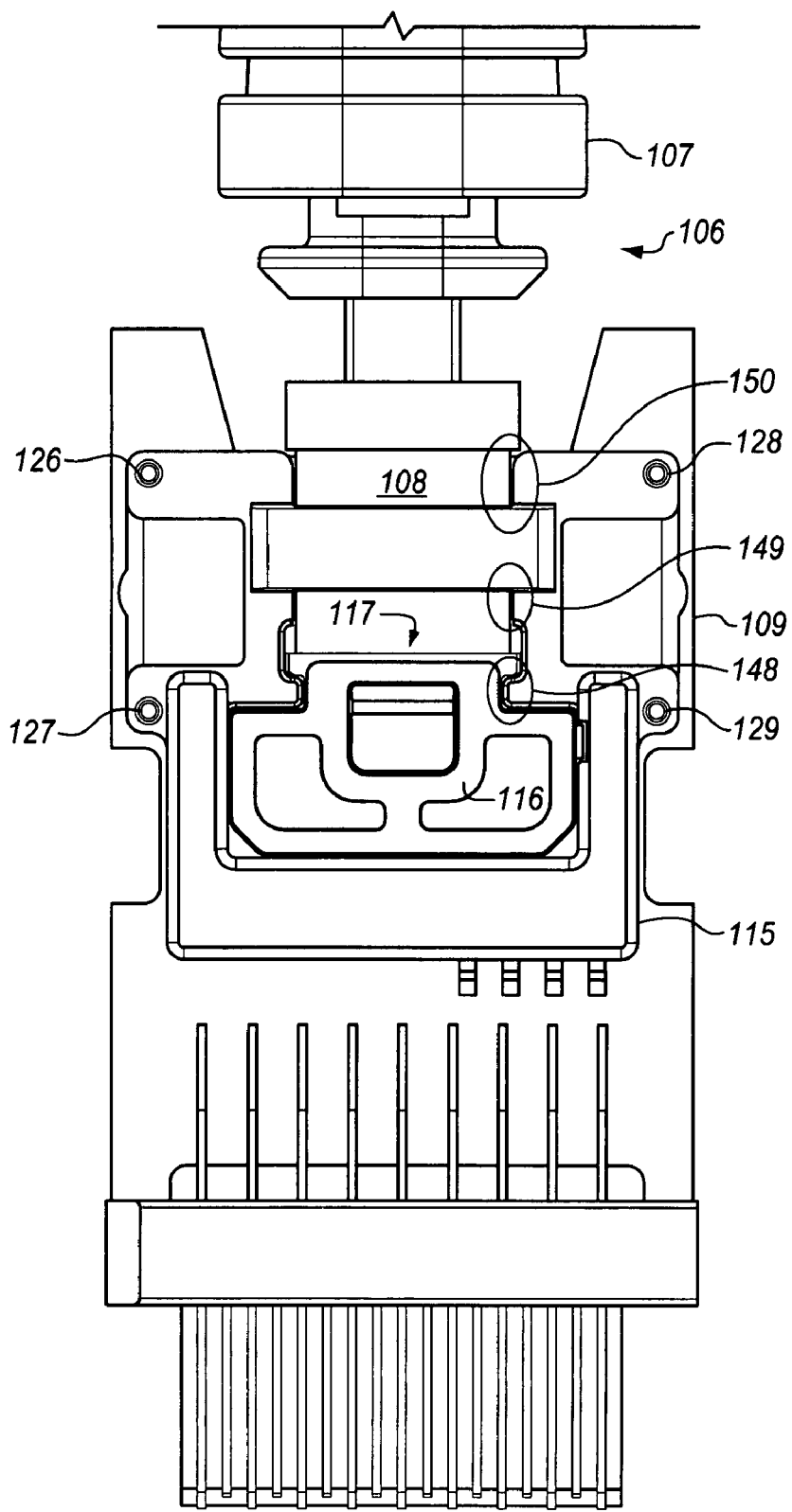
FIG. 8 is a top planar view of a relevant portion of the sub-assembly formed as shown in FIG. 7, according to one or more embodiments of the invention.

FIG. 8 is a top planar view of a relevant portion of the sub-assembly formed as shown in FIG. 7, according to one or more embodiments of the invention. This view shows the matching or mating surfaces between the alignment frame and the lens and ferrule that help to facilitate alignment. In particular, a contoured surface 148 of the alignment frame may facilitate proper positioning and alignment of the lens carrier. Surfaces 149, 150 of the alignment frame may facilitate proper positioning and alignment of the ferrule. These are just a few illustrative examples of the surfaces that may facilitate proper positioning and alignment.

Advantageously, by using some or all of the alignment features described above, the lens carrier may be accurately aligned to the alignment frame, and the ferrule may be accurately aligned to the alignment frame. In this way, the optical fibers of the ferrule may be accurately aligned to the lens array of the lens carrier by using the alignment frame. This may allow passive alignment without the need to resort to more intensive or expensive active alignment.

After aligning the ferrule to the lens array, in one or more embodiments of the invention, a ferrule latch may optionally be applied to hold or force the ferrule and the lens array together in alignment. However, the use of a ferrule latch is optional and is not required.

FIGS. 9A-B are perspective views of the top and bottom, respectively, of a ferrule latch, according to one or more embodiments of the invention. The ferrule latch may be formed of a sufficiently rigid material, such as, for example, a shaped metal sheet or a molded plastic. The ferrule latch may have a relatively low profile.

The ferrule latch has a first end or portion 152 to latch a ferrule. The first end may be placed over the ferrule. The first end or portion may optionally have hooks or other latches 153 to hook or latch an end, edge, ridge, or other hookable or latchable structure of the ferrule. The ferrule latch also has a second, opposing end or portion 154. The second end or portion may be placed over the end of the alignment frame opposite the ferrule. In one aspect, this may include extending a spring tab or other extendable structure over the alignment frame to apply a force. The second end may also optionally have hooks or other latches 156 to hook or otherwise latch an end, edge, ridge, or other hookable or latchable structure of the alignment frame.

The ferrule latch further has a horizontal spring tab 155. The horizontal spring tab may be extended or stretched over the same end of the alignment frame or over an edge, end, ridge, or other portion of the alignment frame. This may cause the horizontal spring tab to exert a clamping force in a direction toward the first end. This clamping force may press and hold the ferrule and lens carrier together, which may help to maintain good alignment and optical coupling between the optical fibers of the ferrule and the lens array of the lens carrier.

In one or more embodiments of the invention, the ferrule latch may also have one or more vertical spring tabs 157. The vertical spring tabs, which are optional and not required, may help to force the lens carrier toward the circuit substrate. Once the ferrule latch has been applied, one or more of the alignment frame, the lens carrier, and the ferrule may optionally be further held in position by applying glue or other adhesive.

Figure 10A:
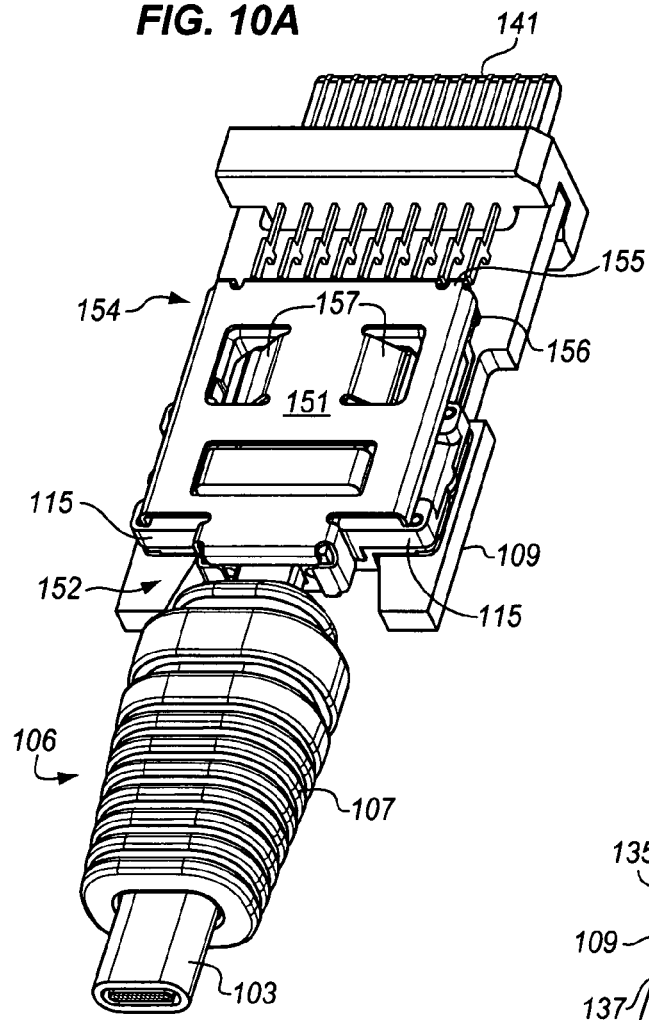
FIGS. 10A-B are perspective views of the top and bottom, respectively, of the ferrule latch applied to a sub-assembly, according to one or more embodiments of the invention.
Figure 10B:
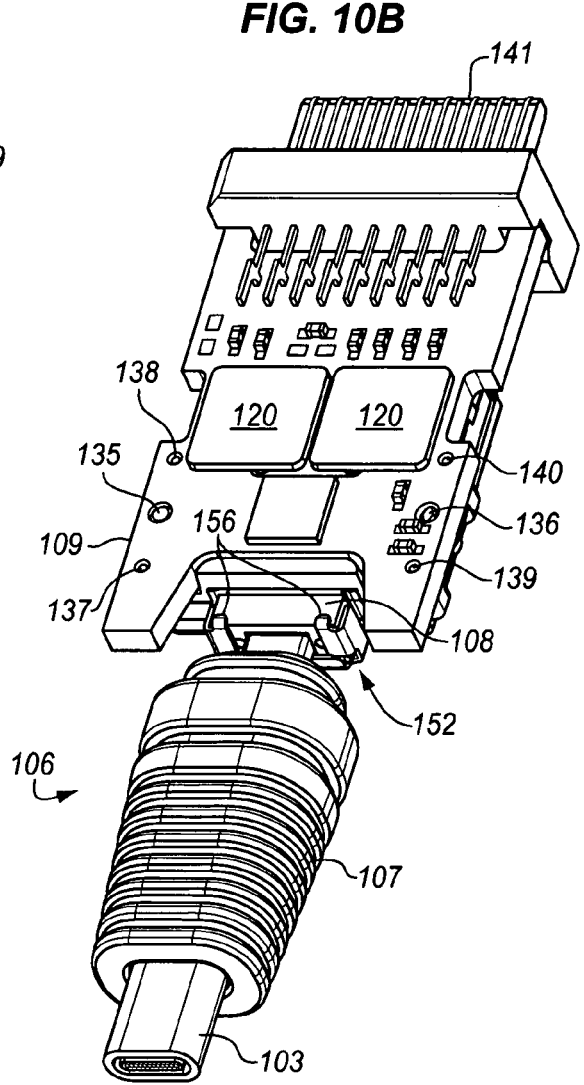

FIGS. 10A-B are perspective views of the top and bottom, respectively, of the ferrule latch 151 applied to a sub-assembly, according to one or more embodiments of the invention. In one aspect, the sub-assembly may be the same as or similar to that formed as shown in FIG. 7.

Figure 11:
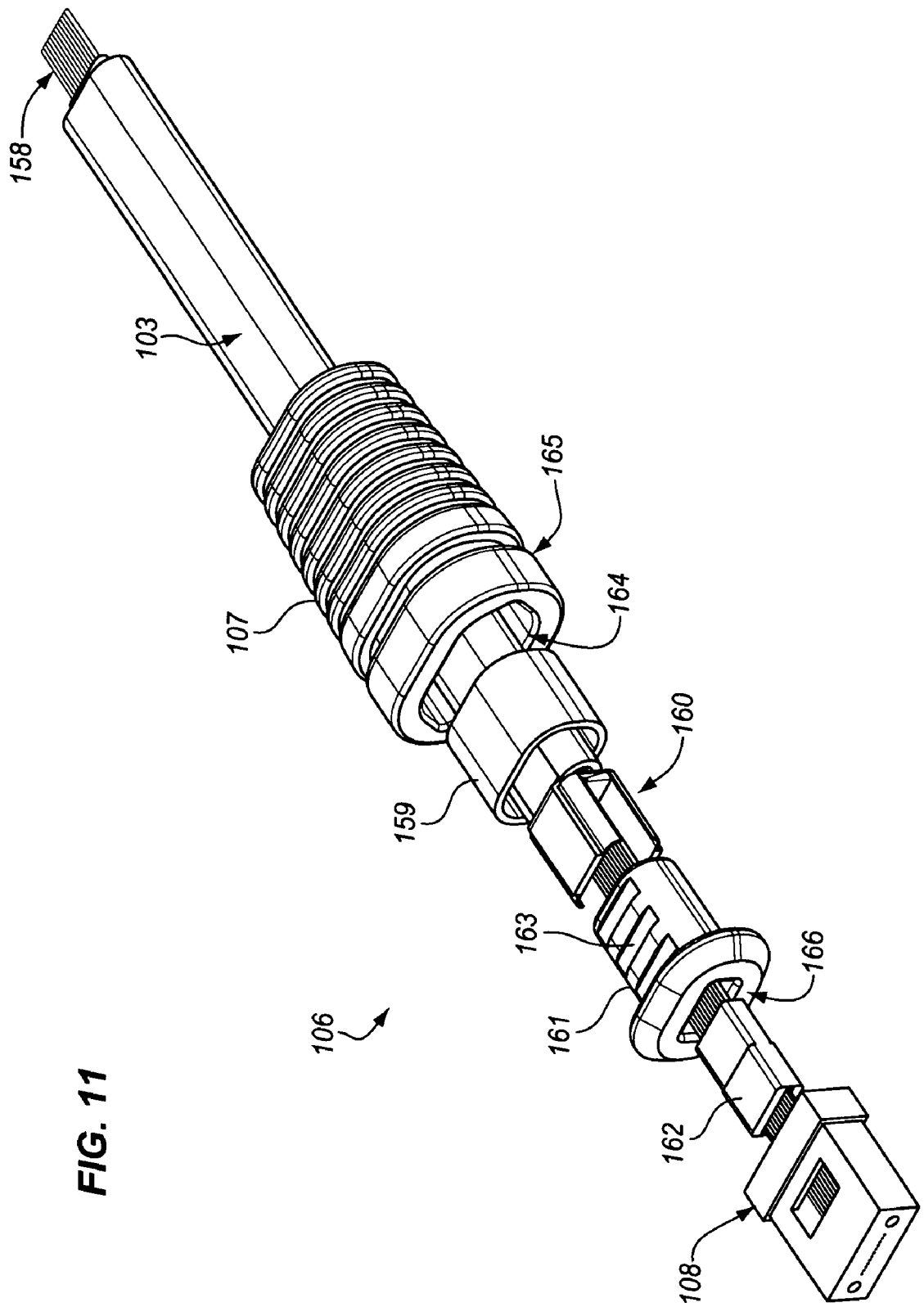
FIG. 11 is an exploded perspective view of an optical cable termination, according to one or more embodiments of the invention.

FIG. 11 is an exploded perspective view of an optical cable termination 106, according to one or more embodiments of the invention. The optical cable termination includes ribbonized optical fibers 158, a cable jacket 103, a cable bushing 107, a crimp ring 159, a split cable jacket 160, a crimp ring base 161, a ferrule boot 162, and a ferrule 108. The illustrated components of the optical cable termination may be compacted together so that they are assembled in proper relative position and in tight fit by generally compressing the exploded view along the axis of the optical cable.

In particular, the cable jacket surrounds and protects the ribbonized optical fibers. The cable jacket may optionally include arimid yarn strength members, such as, for example, KEVLAR® brand high strength fibers inside. A termination of the cable jacket is split on sides thereof to form the split cable jacket having upper and lower halves or portions. The split cable jacket may optionally include arimid yarn strength members, such as, for example, KEVLAR® brand high strength fibers inside. The crimp ring has retainment structures 163, such as, for example, one or more grooves, ridges, ledges, bumps, dimples, or the like, or combinations thereof. The crimp ring base may be introduced or sandwiched between the upper and lower halves of the split cable jacket. The crimp ring may be slid or otherwise moved over the crimp ring base sandwiched between the upper and lower halves of the split cable jacket. The end of the cable bushing has an opening 164 just large enough to accommodate or receive the crimp ring therein. The cable bushing may be slid or otherwise moved to accommodate the crimp ring into the opening in the end of the cable bushing. The cable bushing also has a clamping groove 165, which as will be discussed further below, may be clamped by features on the housing. The end of the crimp ring base has an opening 166 just large enough to accommodate or receive a portion of the ferrule boot therein. The portion of the ferrule boot may be inserted into this opening. This configuration may be moved toward the ferrule so that the ferrule boot is inserted into an opening in the crimp ring base. The crimp ring, which may be a metal or other deformable material, may be crimped or otherwise deformed, for example, by being squeezed. This may crimp, compress, or force the split cable jacket onto the crimp ring base. The retainment structures of the crimp ring base may help to hold the split cable jacket in place.

Figure 12:
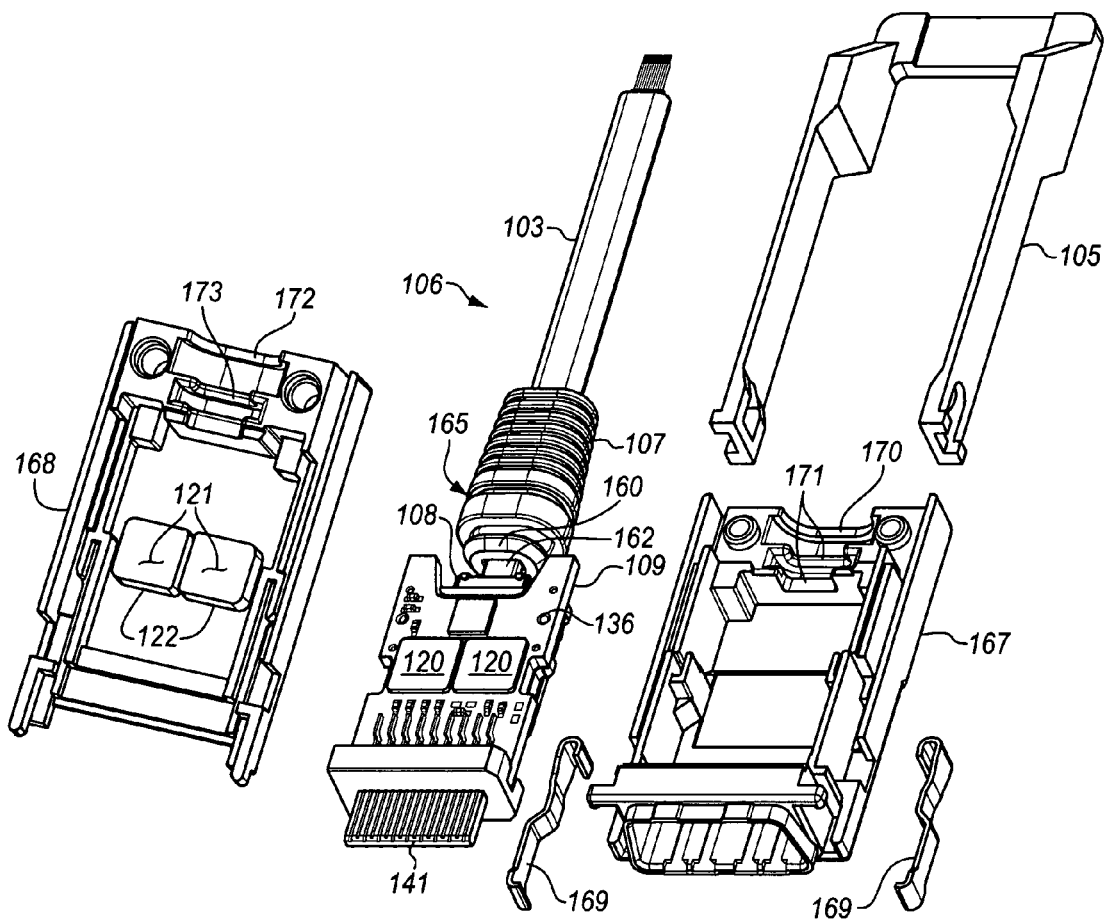
FIG. 12 is a perspective view of a sub-assembly similar to that shown in FIG. 10B, a top housing half or portion, a bottom housing half or portion, an optional pull bail, and optional pull bail latches, which may be assembled together, according to one or more embodiments of the invention.

After assembling any optional ferrule latch, the housing may be assembled. FIG. 12 is a perspective view of a sub-assembly similar to that shown in FIG. 10B, a top housing half or portion 167, a bottom housing half or portion 168, an optional pull bail 105, and optional pull bail latches 169, according to one or more embodiments of the invention.

The top and bottom housing portions may join or mate to enclose and protect the sub-assembly. The top and bottom housing portions may include molded plastic, shaped metal, other materials, and combinations of materials. The top and bottom houses may also help to contain electromagnetic interference (EMI). In one or more embodiments of the invention, the assembled housing may optionally include one or more EMI containment structures. Examples of suitable EMI containment structures include, but are not limited to, overlapping sides of the upper and lower housing portions, overlapping edges, flanges, or surfaces at an interface where the upper and lower housing portions mate, overlapping edges, flanges, or surfaces at an interface of attachment wherein the end electrical connector is coupled with the housing, and overlapping edges, flanges, or surfaces at mating surfaces of the upper and lower housing portions around screw holes that are used to hold the upper and lower housing portions together.

As shown in the illustrated embodiment, the top and bottom housing portions may have ridges, edges, or other structures or portions to clamp on the optical cable termination 106. In particular, the top housing portion has a first contoured ridge 170 to clamp on the cable bushing. In one or more embodiments of the invention, the first contoured ridge may clamp on the clamping groove 165 of the cable busing, although the scope of the invention is not limited in this respect. The top housing portion also has a second contoured ridge 171 to clamp on the crimp ring base. Likewise, the bottom housing portion has a corresponding first contoured ridge 172 to clamp on the cable bushing, and a corresponding second contoured ridge 173 to clamp on the crimp ring base. These clamping structures of the housing may help to clamp the cable assembly in fixed location.

Optional posts 122 (which will be discussed further below) of the bottom portion of the housing designed to conduct heat away from heat generating components are readily visible in the view of the bottom housing portion. As shown in the illustrated embodiment, optional thermal interface materials 121 (which will be discussed further below) may optionally be included on the upper surfaces of the posts, although this is not required. Likewise, optional heat spreaders 120 (which will be discussed further below) are readily visible on the upper (as viewed) surface of the sub-assembly.

As discussed above, the optical cables discussed herein may include one or more integrated circuits and one or more optoelectronic components. Integrated circuits and optoelectronic components are heat generating components that generate heat during operation. Such heat may tend to increase the temperature inside the housings. This may potentially adversely affect or at least change the performance of certain components, such as, for example, VCSEL. Additionally, the reliability of many microelectronic components may tend to be adversely affected by sufficiently high temperatures.

Figure 13:
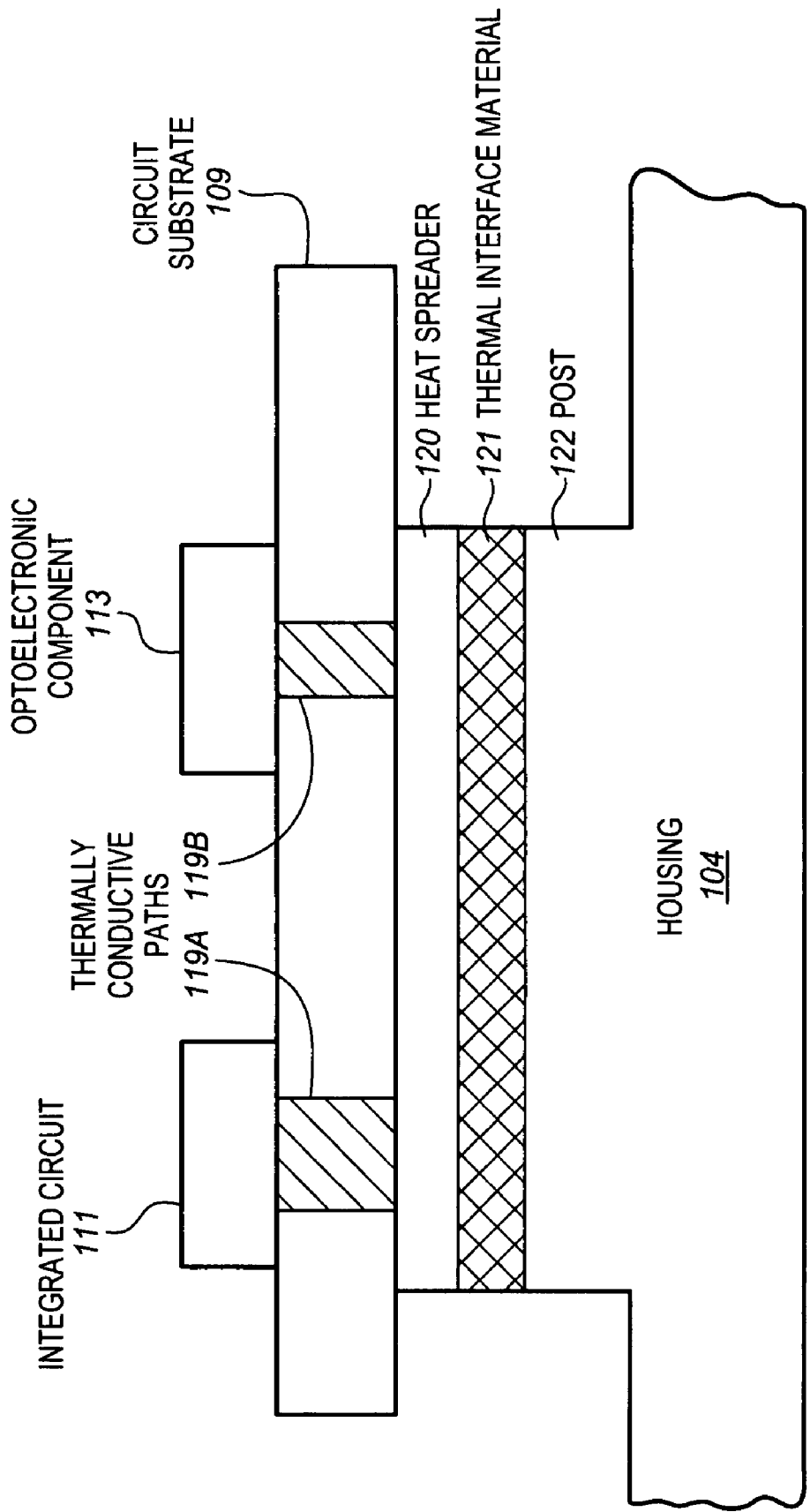
FIG. 13 is a cross-sectional view of a portion of a terminal end of an optical cable connector showing a heat transfer system to transfer heat away from heat generating components, according to one or more embodiments of the invention.

FIG. 13 is a cross-sectional view of a portion of a terminal end of an optical cable connector showing a heat transfer system to transfer heat away from heat generating components, according to one or more embodiments of the invention.

As shown, an integrated circuit 111 and an optoelectronic component 113 may be electrically coupled with a PCB or other circuit substrate 109. The integrated circuit and the optoelectronic component are heat generating components that generate heat during operation.

Thermally conductive paths 119A,B are included through the circuit substrate proximate the heat generating components in order to conduct heat away from the heat generating components. In particular, a first conductive path 119A is included through the circuit substrate directly below the integrated circuit, and a second conductive path 119B is included through the circuit substrate directly below the optoelectronic component. The tops of the thermally conductive paths may be thermally coupled with or to the respective heat generating components.

In one or more embodiments of the invention, a conductive path may include a hole through the circuit substrate having a conductive material therein. Initially, a hole may be formed in the circuit substrate. Examples of suitable approaches for forming the hole include, but are not limited to, drilling, punching, pressing, cutting, puncturing, and other forms of mechanical action, as well as etching, and other forms of chemical action.

Then, a conductive material may be introduced into or otherwise included in the hole. By way of example, in one or more embodiments of the invention, a thermal via may be formed by depositing and/or dispensing one or more conductive materials into the opening. Examples of suitable materials include, but are not limited to, electroplated metals, solder, conductive epoxies, and conductive pastes. As another example, in one or more embodiments of the invention, a metal post may be formed by inserting or otherwise introducing a pre-formed or pre-shaped metal post into the hole. The metal post may optionally have a highly conductive metal, such as, for example, aluminum, copper, stainless steel, iron, nickel, gold, platinum, silver, or a combination of two or more of such metals. A combination of such approaches may also optionally be used. For example, in one or more embodiments of the invention, thermal vias may be used for optoelectronic components or otherwise for smaller holes, while metal posts may be used for integrated circuits or otherwise for larger holes.

As shown in the illustrated embodiment, there may be a one-to-one correspondence between heat generating components and thermally conductive paths. Alternatively, multiple heat generating components may be provided per thermally conductive path. As another option, multiple thermally conductive paths may be provided per heat generating component. As yet another option, a combination of such approaches may be used. Thusly, one or more conductive paths may be used to conduct heat from one or more heat generating components.

Referring again to FIG. 13, the illustrated heat transfer system further includes an optional heat spreader 120 to receive heat from the thermally conductive paths. The illustrated heat spreader is thermally coupled with the bottom ends of the thermally conductive paths opposite the heat generating components. In one aspect, the heat spreader may be glued, soldered, or otherwise adhered to the circuit substrate. The heat spreader may provide a larger surface area and/or a high thermal conductivity to efficiently transfer heat away from the heat generating components toward an ambient or heat sink. In one or more embodiments of the invention, the heat spreader may include a metal or otherwise conductive plate, such as, for example, a copper, aluminum, or solder plate, on an opposite side of the circuit substrate as the heat generating components. The metal plate may either be a discrete component attached or soldered to the circuit substate, or a portion of a metal layer deposited, printed, dispensed, reflowed, or otherwise formed on the circuit substrate. As shown, a single heat spreader may optionally be used for multiple thermally conductive paths.

The illustrated heat transfer system further includes an optional thermal interface material 121 to receive heat from the heat spreader. The illustrated thermal interface material is thermally coupled with the bottom surface of the heat spreader opposite the surface of the heat spreader that is abutting or adjacent the circuit substrate. The thermal interface material, which is optional, may help to facilitate transfer of heat away from the heat generating components through the conductive paths and heat spreader. The thermal interface material may help to eliminate or at least reduce air gaps or space between the heat spreader and the post. Also, the thermal interface material may be relatively thin, such as, for example, less than about a millimeter in thickness, since it tends to have a lower thermal conductivity than the heat spreader and conductive paths, although higher than air. In one or more embodiments of the invention, the thermal interface material may optionally be compressible in thickness, such as, for example, having a compressibility of at least about 40% of its thickness. Although this is not required, such compressibility may help to maintain good thermal contact and compensate for variation in thickness tolerances of the circuit substrate, heat spreader, and housing. Examples of suitable thermal interface materials include, but are not limited to, phase change materials, pressure sensitive adhesive films, thermally conductive adhesive tapes, thermally conductive elastomers or elastomeric pads, curable thermally conductive compositions, thermal greases, thermally conductive gap filler thermal interface materials, and combinations thereof.

The illustrated heat transfer system further includes a post 122 of the exterior housing 104 of the terminal end of the optical cable. By way of example, the post may be shaped or formed by molding or die casting during the formation of the housing, although this is not required. The post may help to compress the thermal interface material against the heat spreader. As partly shown, the post may have generally the same footprint as the heat spreader and may represent a localized raised surface of the housing.

The post may receive heat from the thermal interface material or otherwise receive heat conducted away from the heat generating components through the intervening heat transfer structures or materials. In one or more embodiments of the invention, the post and/or at least a portion of the housing proximate the heat generating components may be thermally conductive or at least partially thermally conductive. Examples of suitable thermally conductive materials include, but are not limited to, metals, thermally conductive polymers, materials with metals or other thermally conductive fillers, and the like. In one aspect, if the material of the housing proximate the post is not sufficiently thermally conductive, the post may include metal fins, or other conductive structures embedded therein to facilitate distribution of heat throughout the post and from the post to the housing. In one or more embodiments of the invention, the post and/or a portion of the housing in the general region of the heat generating components may include a localized conductive filler, conductive fibers, or a metal piece or segment to further promote heat transfer therethrough.

A particular heat transfer system has been shown and described to illustrate certain concepts, although the scope of the invention is not limited to just this particular heat transfer system. In alternate embodiments of the invention, the heat spreader and/or the thermal interface material may optionally be omitted. For example, the post may directly contact the heat spreader without using the thermal interface material or else the thermal interface material may directly contact the bottom of the conductive paths without the heat spreader. In alternate embodiments of the invention, the post may optionally be omitted. For example, rather than dissipating heat to the housing, a heat pipe, air jet, or fan may cool the bottom surface of the thermally conductive paths and/or the heat spreader. In yet another alternate embodiment of the invention, the heat spreader may be replaced by a heat pipe that receives heat directly from the bottoms of the conductive paths. These are just a few possible modifications. Many further modifications will be apparent to those skilled in the art and having the benefit of the present disclosure.

Figure 14:
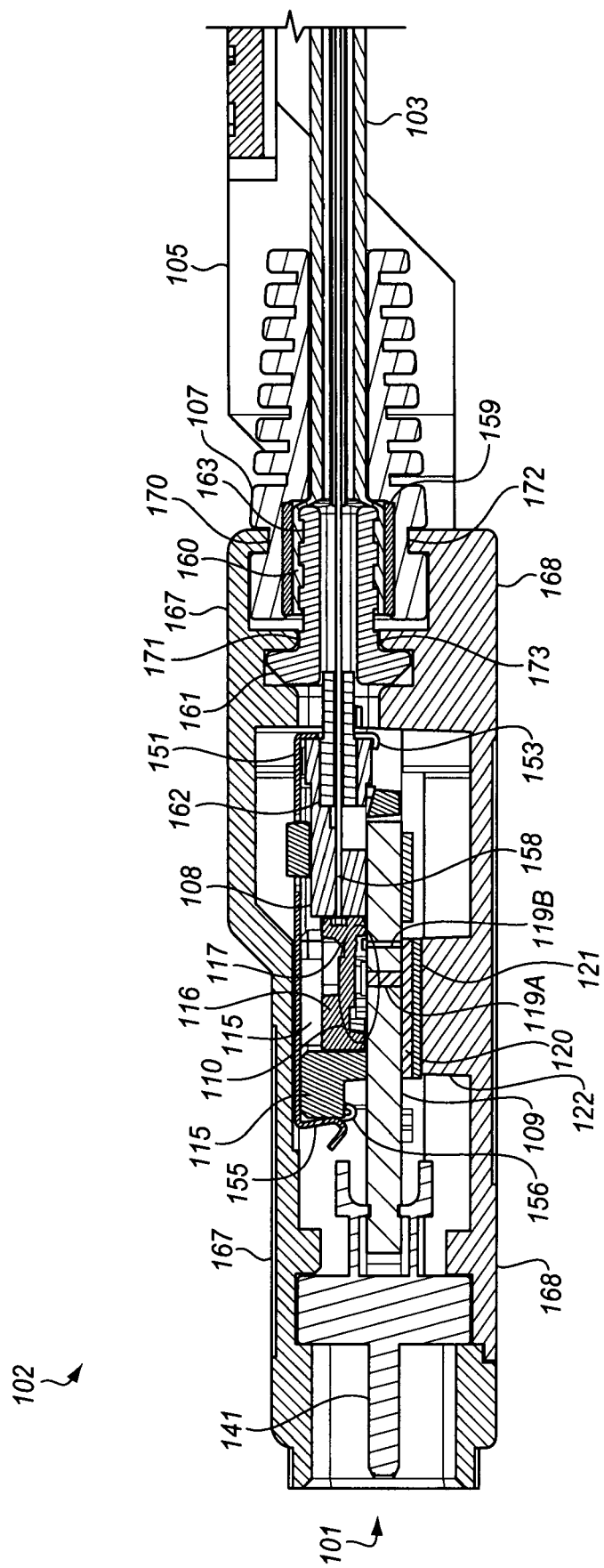
FIG. 14 is a cross-sectional view of a terminal end of an optical cable connector, according to one or more embodiments of the invention.

FIG. 14 is a cross-sectional view of a terminal end of an optical cable connector, according to one or more embodiments of the invention. The reference numbers referred to above have been repeated in this view. As shown, the alignment frame 115 is coupled with the circuit substrate 109. The lens carrier 116 is aligned and coupled with the alignment frame. The ferrule 108 is aligned and coupled with the alignment frame. A ferrule latch 151 is latched or clasped to the ferrule and alignment frame to holds the ferrule and lens carrier together in alignment. Hooks or latches 153, 156 are shown against corresponding hookable or latchable features. The heat transfer system is also visible in this view. The heat transfer system includes thermally conductive paths 119A/B, heat spreader 120, thermal interface material 121, and posts 122. Other components referred to herein and their couplings are also shown and will not be repeated to avoid obscuring the description.

Figure 15:
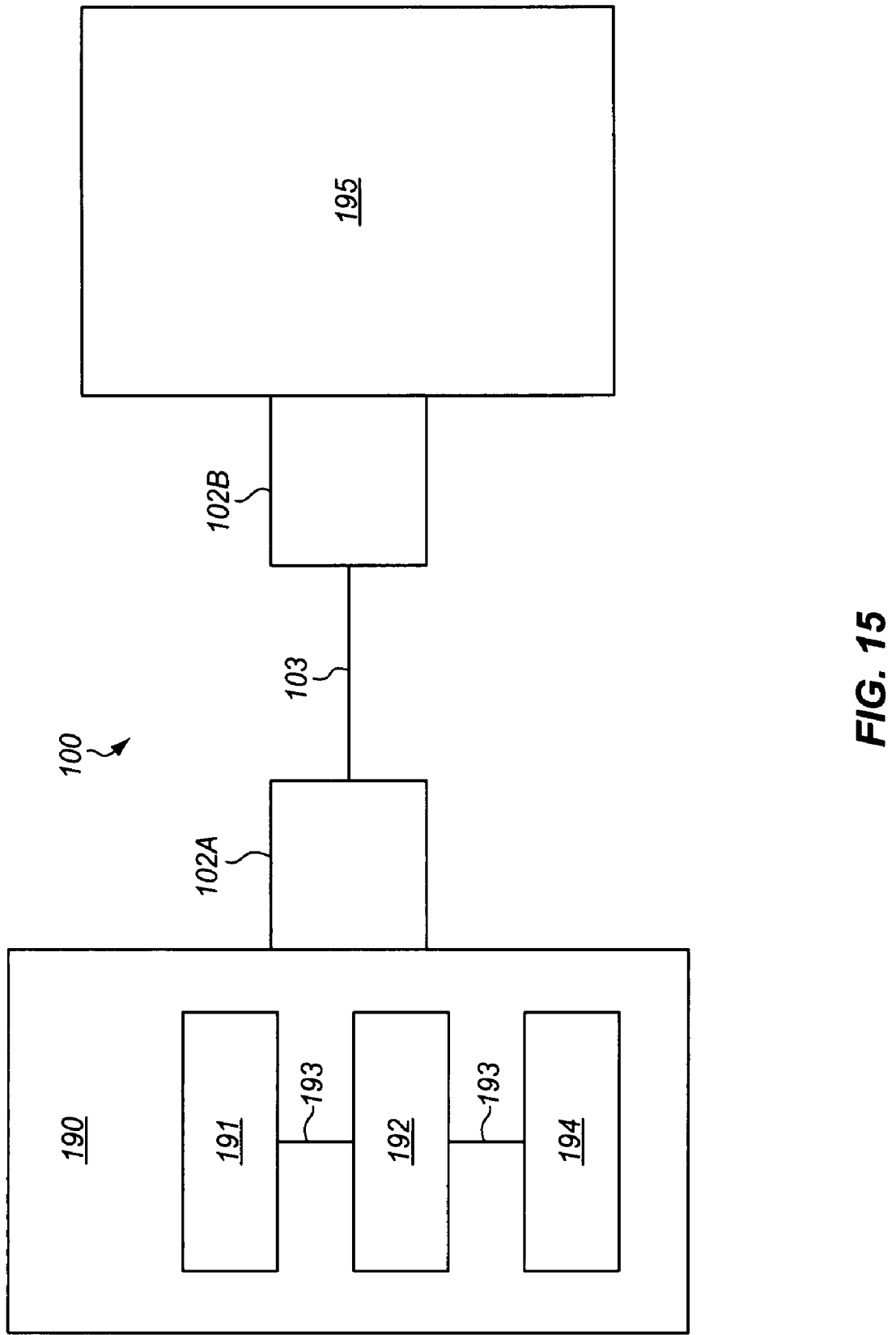
FIG. 15 is a block diagram showing a first electronic device coupled to a second electronic device by an optical cable connector, according to one or more embodiments of the invention.

FIG. 15 is a block diagram showing a first electronic device 190 coupled to a second electronic device 195 by an optical cable connector 100, according to one or more embodiments of the invention. The optical cable connector may optionally have one or more of the characteristics discussed elsewhere herein.

In one or more embodiments of the invention, the first electronic device may include a computer system. Examples of suitable computer systems include, but are not limited to, desktop computers, laptop computers, palmtop computers, servers, server blades, and the like. The first electronic device includes one or more processors 191, one or more memories 192, and optionally one or more other components 194 functionally coupled together by one or more buses or other interconnects 193.

In one or more embodiments of the invention, the one or more processors may include a microprocessor available from Intel Corporation, of Santa Clara, Calif., although this is not required. In one or more embodiments of the invention, the processor may have multiple cores, although this is not required. In embodiments of the invention, a memory controller hub may either be integrated with, or separate from, a processor.

In one or more embodiments of the invention, the one or more memories may include a main memory, such as, for example, a random access memory (RAM) or other dynamic storage device. Different types of RAM memory that are each included in some, but not all computer systems, include, but are not limited to, static-RAM (SRAM) and dynamic-RAM (DRAM). In one or more embodiments of the invention, the one or more memories 192 may include DRAM, although this is not required.

In one or more embodiments of the invention, the one or more memories may include a non-volatile memory. Different types of non-volatile memories that are each included in some, but not all, computer systems include Flash memory, programmable ROM (PROM), erasable-and-programmable ROM (EPROM), and electrically-erasable-and-programmable ROM (EEPROM).

In one or more embodiments of the invention, the one or more other components may include one or more of a chipset, a graphics chip, a communication device, a display device, a keyboard, a cursor control device, and the like.

Various different types of electronic devices may be used for the second electronic device 195 in various embodiments of the invention. In one or more embodiments of the invention, the second electronic device may include a second computer system, such as, for example, a server. In one particular embodiment of the invention, the first and second electronic devices may each include servers that may exchange data rapidly using the optical cable. Alternatively, in one or more embodiments of the invention, the second electronic device may include a display device, or other type of electronic device. These are just a few illustrative examples. Other possibilities will be apparent to those skilled in the art and having the benefit of the present disclosure.

In the description above, and in the figures, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known circuits, structures, devices, and operations have been shown in simplified form or without detail in order to avoid obscuring the understanding of the description.

Furthermore, in the description and claims, the terms "coupled" and "connected," along with their derivatives, may be used. It should be understood that these terms are not intended as synonyms for each other. Rather, in particular embodiments, "connected" may be used to indicate that two or more components are in direct physical, electrical, or thermal contact with each other. "Coupled" may mean that two or more components are in direct physical, electrical, or thermal contact. However, "coupled" may also mean that two or more components are not in direct contact with each other, but yet still co-operate or interact with each other, such as, for example through an intervening components.

It will also be appreciated, by one skilled in the art, that modifications may be made to the embodiments disclosed herein, such as, for example, to the sizes, shapes, configurations, forms, functions, materials, and manner of operation, and assembly and use, of the components of the embodiments. All equivalent relationships to those illustrated in the drawings and described in the specification are encompassed within embodiments of the invention.

In the description above, and in the figures, certain reference numerals have been repeated. This may indicate elements or components that may optionally be the same, similar, or analogous, although different elements or components entirely may alternatively optionally be used.

Various operations and methods have been described. Some of the methods have been described in a basic form, but operations may optionally be added to and/or removed from the methods. The operations of the methods may also often optionally be performed in different order. Many modifications and adaptations may be made to the methods and are contemplated.

It should also be appreciated that reference throughout this specification to "one embodiment", "an embodiment", or "one or more embodiments", for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

Accordingly, while the invention has been thoroughly described in terms of several embodiments, those skilled in the art will recognize that the invention is not limited to the particular embodiments described, but may be practiced with modification and alteration within the spirit and scope of the appended claims. The description is thus to be regarded as illustrative instead of limiting.

The invention claimed is:

1. An apparatus comprising:
an alignment frame;
a ferrule aligned with the alignment frame;
a ferrule latch latching the ferrule to the alignment frame, wherein the ferrule latch has a first portion over the ferrule to latch the ferrule and a second, opposite portion stretched over the alignment frame to provide a clamping force to force the ferrule and the alignment frame together;
a lens carrier aligned with the alignment frame, further comprising one or more alignment structures of the lens carrier mated with one or more corresponding alignment structures of the alignment frame, wherein the corresponding mated alignment structures comprise one or more male members inserted into one or more corresponding female members.

2. The apparatus of claim 1, further comprising a circuit substrate coupled with the alignment frame.

3. The apparatus of claim 2, wherein the ferrule latch comprises a spring tab coupled with the lens carrier to force the lens carrier toward the circuit substrate.

4. The apparatus of claim 1, wherein the ferrule latch is applied to force the ferrule and lens carrier together.

5. An apparatus comprising:
an alignment frame;
a ferrule aligned with the alignment frame;
a ferrule latch latching the ferrule to the alignment frame, wherein the ferrule latch has a first portion over the ferrule to latch the ferrule and a second, opposite portion stretched over the alignment frame to provide a clamping force to force the ferrule and the alignment frame together;
an optical cable termination including the ferrule; and
a housing enclosing the alignment frame, the ferrule, and the ferrule latch,
wherein the housing has a structure that clamps the optical cable termination.

6. The apparatus of claim 5, wherein the optical cable termination comprises a cable bushing that is clamped by the structure of the housing.

7. The apparatus of claim 6, wherein the cable bushing has a groove that is clamped by a ridge of the housing.

8. The apparatus of claim 7, wherein the housing has mated top and bottom housing portions and wherein each of the lop and bottom housing portions has a corresponding contoured ridge that clamps the groove of the cable bushing.

9. The apparatus of claim 5, wherein the ferrule latch comprises a shaped metal sheet having a low profile.

10. The apparatus of claim 5, wherein the ferrule latch covers the alignment frame.

11. The apparatus of claim 5, wherein the ferrule latch comprises structures to provide both horizontal and vertical forces to the alignment frame.

12. The apparatus of claim 5, wherein the first portion comprises one or more hooks to hook on one or more hookable structures of the ferrule.

13. The apparatus of claim 5, wherein the second portion comprises an extendable portion that is extended over the alignment frame.

14. The apparatus of claim 13, wherein the extendable portion comprises a spring tab that is extended over an end of the alignment frame.

15. The apparatus of claim 5, wherein the ferrule is inserted through an alignment opening of the alignment frame.

16. An apparatus comprising:
an alignment frame;
a ferrule aligned with the alignment frame;
a ferrule latch latching the ferrule to the alignment frame, wherein the ferrule latch has a first portion over the ferrule to latch the ferrule and a second, opposite portion stretched over the alignment frame to provide a clamping force to force the ferrule and the alignment frame together;
a circuit substrate coupled with the alignment frame;
a lens carrier aligned with the alignment frame; and
a vertical spring tab of the ferrule latch to force the lens carrier toward the circuit substrate.

* * * * *

UNITED STATES PATENT AND TRADEMARK OFFICE
CERTIFICATE OF CORRECTION

PATENT NO. : 7,452,139 B2 Page 1 of 1
APPLICATION NO. : 11/890242
DATED : November 18, 2008
INVENTOR(S) : Wang et al.

It is certified that error appears in the above-identified patent and that said Letters Patent is hereby corrected as shown below:

In column 16, at line 63, delete "lop" and insert --top--.

Signed and Sealed this

Seventh Day of July, 2009

JOHN DOLL
*Acting Director of the United States Patent and Trademark Office*